(12) United States Patent
Moshammer

(10) Patent No.: US 10,584,746 B2
(45) Date of Patent: Mar. 10, 2020

(54) LINEAR GUIDE WITH SELF-ADJUSTING PLAY REDUCTION

(71) Applicant: igus GmbH, Cologne (DE)

(72) Inventor: Horst Moshammer, Linz am Rhein (DE)

(73) Assignee: IGUS GMBH, Cologne (DE)

( * ) Notice: Subject to any disclaimer, the term of this patent is extended or adjusted under 35 U.S.C. 154(b) by 0 days.

(21) Appl. No.: 15/762,865

(22) PCT Filed: Sep. 21, 2016

(86) PCT No.: PCT/EP2016/072389
§ 371 (c)(1),
(2) Date: Aug. 13, 2018

(87) PCT Pub. No.: WO2017/050809
PCT Pub. Date: Mar. 30, 2017

(65) Prior Publication Data
US 2018/0372154 A1     Dec. 27, 2018

(30) Foreign Application Priority Data
Sep. 23, 2015   (DE) .................... 20 2015 105 035 U

(51) Int. Cl.
*F16C 29/12* (2006.01)
*F16C 29/02* (2006.01)

(52) U.S. Cl.
CPC ............ *F16C 29/126* (2013.01); *F16C 29/02* (2013.01); *F16C 29/123* (2013.01)

(58) Field of Classification Search
CPC ...... F16C 29/001; F16C 29/02; F16C 29/123; F16C 29/126
(Continued)

(56) References Cited

U.S. PATENT DOCUMENTS 3,198,588 A  *  8/1965  Cashman ................ B23Q 1/26
                                                     384/54
6,880,974 B2     4/2005  Moshammer
(Continued)

FOREIGN PATENT DOCUMENTS

CH         105541        7/1924
CH         663373       12/1987
(Continued)

OTHER PUBLICATIONS

English translation of the International Search Report from corresponding PCT Application No. PCT/EP2016/072389, dated Dec. 9, 2016.
(Continued)

*Primary Examiner* — James Pilkington
(74) *Attorney, Agent, or Firm* — Grossman, Tucker, Perreault & Pfleger, PLLC

(57) ABSTRACT

A linear guide which is of a simple structure and which can be easily fitted, having self-adjusting play reduction. It includes a slider with slide surfaces and a rail with guide surfaces, wherein the slider is guided with its slide surfaces adapted to the guide slide surfaces in a slidingly displaceable reciprocating relationship in a displacement direction at the guide surfaces of the rail. The self-adjusting play reduction of the linear guide has at least one adjusting element which according to the invention has a slide surface forming a portion of one of the slide surfaces of the slider.

26 Claims, 2 Drawing Sheets

(58) Field of Classification Search
 USPC .................................. 384/10, 20, 22, 23, 40
 See application file for complete search history.

(56) References Cited

U.S. PATENT DOCUMENTS

| | | | |
|---|---|---|---|
| 8,104,962 B2 * | 1/2012 | Niedermeyer | F16C 29/126 |
| | | | 384/40 |
| 8,636,436 B2 | 1/2014 | Roither et al. | |
| 2014/0332654 A1 | 11/2014 | Knobel et al. | |

FOREIGN PATENT DOCUMENTS

| | | |
|---|---|---|
| DE | 20106914 | 10/2002 |
| DE | 202010003706 | 10/2011 |
| DE | 102013004212 | 8/2014 |
| DE | 102013211869 | 1/2015 |
| GB | 2169825 | 7/1986 |

OTHER PUBLICATIONS

English translation of International Preliminary Examination Report from corresponding PCT Application No. PCT/EP2016/072389 dated Feb. 5, 2018.

* cited by examiner

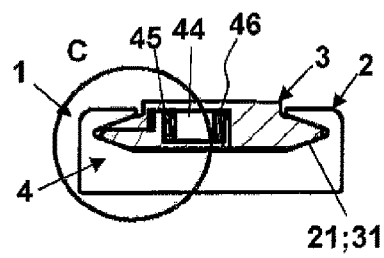
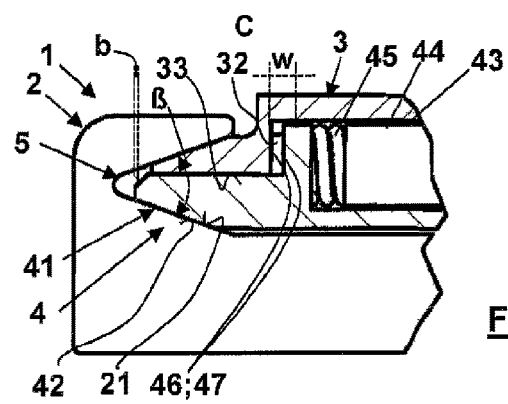
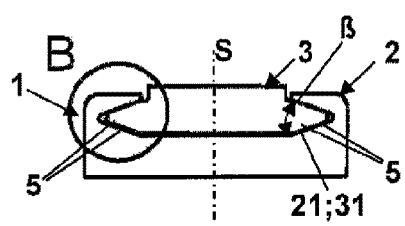
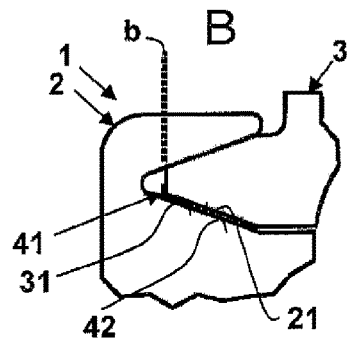
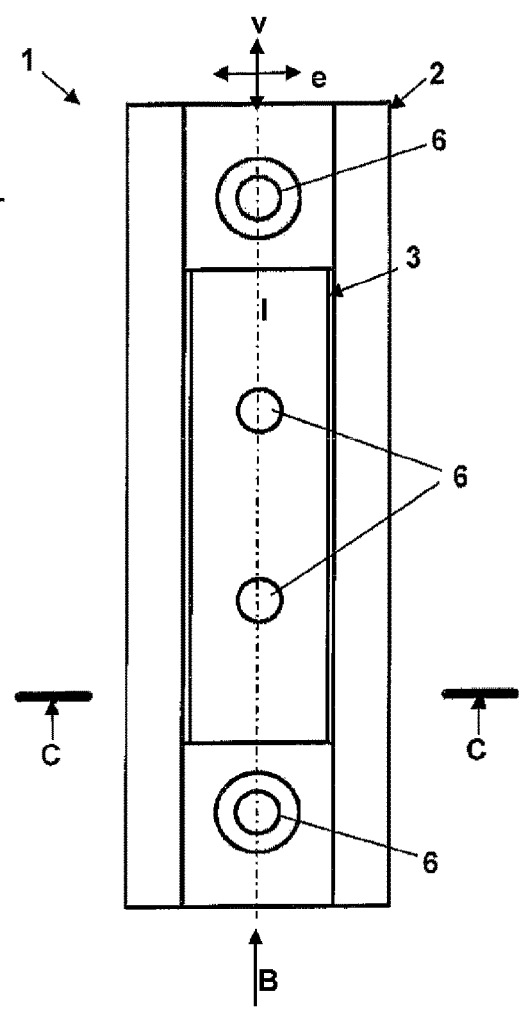
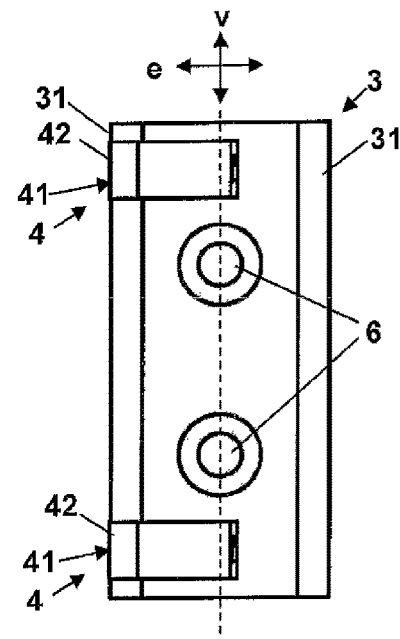

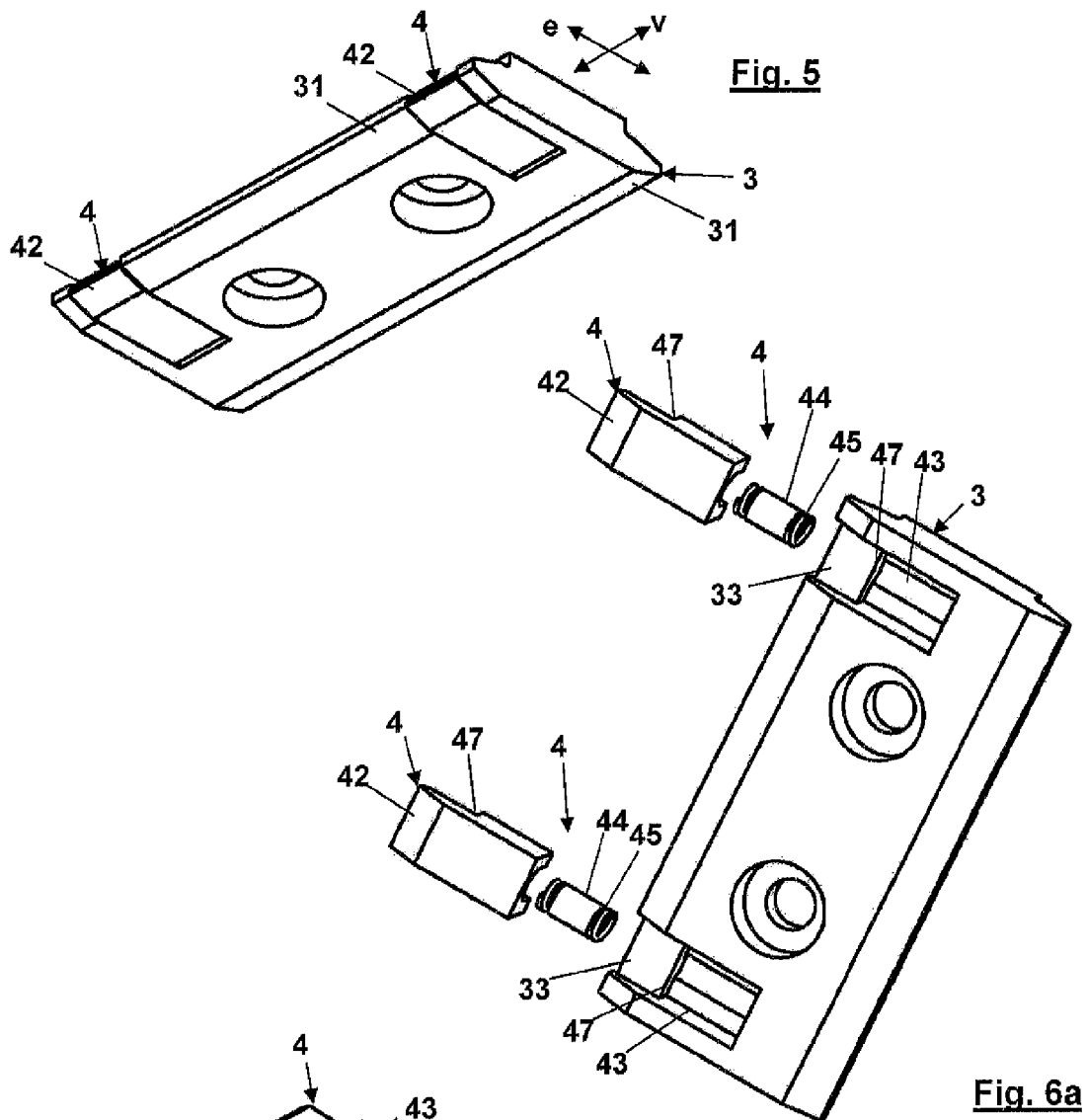
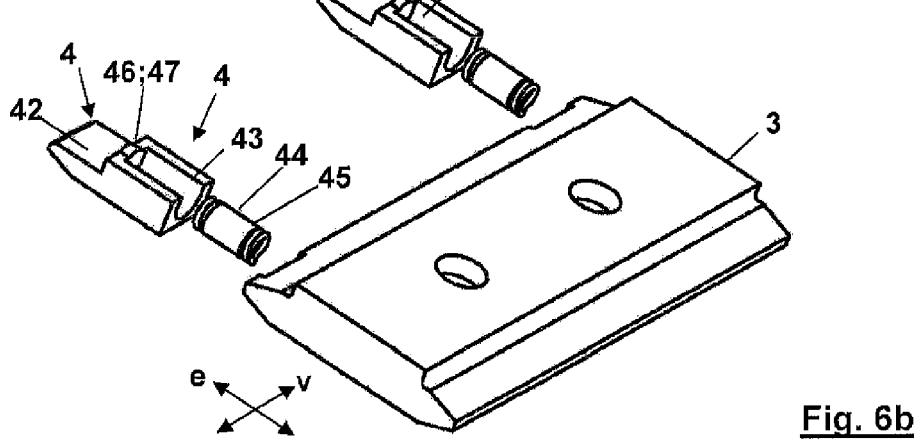
Fig. 5
Fig. 6a
Fig. 6b

LINEAR GUIDE WITH SELF-ADJUSTING PLAY REDUCTION

FIELD

The invention concerns a linear guide having a slider with slide surfaces, a rail with guide slide surfaces, wherein the slider is guided with its slide surfaces adapted to the guide slide surfaces in slidingly displaceable reciprocating relationship in a displacement direction at the guide surfaces of the rail, and a self-adjusting play reduction of the linear guide with at least one adjusting element wherein the adjusting element is mounted in the slider in an adjustment direction perpendicular to the displacement direction of the slider and the slider has a receiving seat in which the adjusting element is guided in slidingly displaceable manner in the adjustment direction.

BACKGROUND

Linear guides with self-adjusting play reduction are already known for the most widely varying uses, for example from patent specifications CH 663 373 A5, DE 10 2013 211 869 A1 or US 2014/332654 A1.

CH 663 373 A5 discloses a linear guide of the above generic type, in which the adjusting element extends over the length of the slide, the adjusting element being pressed against the guide surface of the rail perpendicular to the direction of displacement by means of a cumbersome arrangement of several disc springs arranged over the length of each adjusting element. The disc springs are each arranged in a seat machined into the adjusting element and press against the adjusting element perpendicular to the direction of displacement.

DE 10 2013 004 212 B3 discloses a linear guide with an adjusting element that also extends over the entire slide length. The adjusting element is pressed against the guide surface of the rail by means of an adjustable waved leaf spring, in a direction perpendicular to the direction of displacement. The waved leaf spring is pretensioned by means of several screws, each of which engages the leaf spring laterally. Alternatively, the adjusting element is connected to the slide in one piece over a weakened area and can be pivoted about a swivel axis parallel to the direction of displacement.

According to US 2014/0332654 A1, a linear guide has a slide and a driver, whereby the driver bears against the guide surfaces of a sliding channel in the transverse direction without play. In order to avoid play, complicated wedge elements are provided as adjusting elements, which are each spring-loaded and press over an inclined plane in the direction of travel of the slide against the respective guide surface of the slide channel. A disadvantage is the increased sliding friction that occurs when the control element moves between the inclined planes.

GB 2 169 825 A teaches linear guide of the above generic type, with an adjusting element designed as a wedge element which is spring-loaded in the direction of displacement and slidably mounted in the slide over an inclined plane with a directional component in the direction of adjustment perpendicular to the direction of displacement of the slide.

CH 105 541 A1 describes a linear guide in which a strip is provided between slide and rail as adjusting element, whereby the strip is pressed against the rail under spring load perpendicular to the direction of displacement. For spring loading, a compression spring is provided which, guided by means of the slide in the direction of spring force, acts on the strip.

DE 201 06 914 U1 describes a linear guide of the general kind set forth, in which the adjusting element bears by way of an inclined surface having a stepped profile against an inclined plane of a slide element with adapted stepped profile and the slider slides by way of a slide surface of the slide element on the rail. For self-adjusting play reduction, the adjusting element is spring-loaded in the longitudinal direction of the rail and slides, with a reduction in play, stepwise by way of its inclined surface against the inclined plane of the slide element. Disadvantages here are the complex structure and complex mounting of the linear guide.

SUMMARY

An object of the invention is to provide a linear guide which is of a simpler structure and which can be more easily mounted.

The object of the invention is already attained in that the receiving seat opens into an associated one of the adapted slide surfaces, the adjusting element has a further slide surface capable of forming a portion of one of the associated adapted slide surfaces, wherein in order to reduce play said further slide surface projects by a corresponding amount beyond said associated one of the adapted slide surfaces.

The further slide surface of the adjusting element can be integrated in the associated slide surface of the slider. It can be part of the associated slide surface.

The fact that the support element already forms a portion of one of the slide surfaces of the slider means that the structure of the linear guide is simplified. As the further slide surface of the adjusting element is part of the associated slide surface of the slider, it bears with that slide surface against the guide surface of the rail, that is associated with that slide surface, and can be guided against the guide surface, by virtue of its relative mobility with respect to that slide surface. It is possible to dispense with an additional slide element which simplifies structure and fitment. As the further slide surface of the adjusting element at the same time forms part of the associated slide surface of the slider the structure can also be made more compact.

Play reduction can be effected in such a way that the play of the slider in the rail is reduced and here is in particular minimised, but it can also be set to a given value which is between the play of the slider in the rail without play reduction and the play-free arrangement of the slider in the rail.

The adjusting element can be moved for self-adjusting play reduction in the adjustment direction perpendicularly to a displacement direction in which the rail and the slider are displaceable relative to each other. The further slide surface of the adjusting element can be moved in the adjustment direction relative to the associated slide surface of the slider in accordance with the play adjustment, in particular it can be slidingly displaced for that purpose. The further slide surface of the adjusting element can be displaced for adjustment of the play parallel to the associated slide surface of the slider. At the same time the adjusting element can be displaced with the relative movement of the further slide surface of the adjusting element with respect to the slider. Self-adjusting play reduction means that the play reduction occurs of its own accord, that is to say without intervention from the exterior for example by means of a tool, but solely on the basis of the cooperation of the slider and the rail.

For producing the relative movement of the adjusting element and the slider the adjusting element can be acted upon with a preferably adjustable or regulatable force. That force can be produced for example magnetically or hydraulically. In particular the force can be constant or almost constant.

In advantageously simple fashion the force can be produced by means of a spring device, in particular by means of a coil spring or a plate spring. In particular, the adjusting element can be mounted in the slider under a preferably constant spring biasing. In that case the spring can be supported with one side in the adjustment direction on the adjusting element and in opposite relationship to the adjustment direction on the slider. Advantageously, because of the risk of creep with plastic springs, it is proposed that the spring is made from metal, preferably steel and here, to avoid corrosion, in particular high-quality steel.

In regard to easier movement of the slider in the rail, the adjusting element can be arranged integrated in the slider. The adjusting element can be part of the slider. It can be arranged within the outside contour of the slider. In particular in a working position the adjusting element can project beyond the outside contour of the slider by an amount, preferably only by the amount of the play reduction. In the situation in which no play reduction is necessary in the working position, it can be arranged in one plane with the slide surface of the slider, that is associated therewith, wherein in the course of wear which possibly occurs in operation with increasing play as a consequence the self-adjusting play reduction in respect of that play is reduced. In particular the adjusting element can be arranged accommodated completely in the space enclosed by the outside contour of the slider, apart from a projection portion for play reduction.

Adjustment of the play reduction is effected by way of the further slide surface of the adjusting element sliding on the guide surface of the rail, that is associated therewith. In that way the play reduction can advantageously be effected steplessly. The play reduction can be implemented by parallel displacement of the further slide surface of the adjusting element relative to the guide surface associated therewith.

As a simplification of the structure involved the slide surfaces with play reduction, in particular all guide surfaces and slide surfaces, can be prismatic surfaces. Those prismatic surfaces can extend parallel to the displacement direction. In particular the linear guide can be in the form of a prism guide.

In a further embodiment of the linear guide the adjusting element is mounted preferably slidingly displaceably in the slider in an adjustment direction perpendicular to the displacement direction of the slider. That can provide for the parallel displacement of the further slide surface of the adjusting element relative to the associated slide surface of the slider in the adjustment direction.

For stable sliding mounting of the slider in the rail the slider can have a slide surface pair having two slide surfaces. Of those at least one can be the slide surface associated with the adjusting element. The two slide surfaces of the slide surface pair can be arranged in converging relationship in a wedge shape with a wedge angle perpendicularly and radially outwardly relative to the displacement direction of the slider in the rail. For optimum guidance the guide surfaces of the rail can be so adapted to the respectively associated slide surfaces of the slider and arranged that the mutually associated slide surfaces are arranged in the working position substantially in mutual contact, in particular over the full surface area in contact with each other.

In a development of the linear guide the slider has a receiving seat for the adjusting element. The adjusting element can be arranged guided in sliding displaceable relationship in the adjustment direction in the receiving seat.

In a development of the linear guide the receiving seat can have a side surface disposed in a radial-axial plane for slidingly displaceable support of the adjusting element. For insertion of the adjusting element the receiving seat can be of a configuration which is open perpendicularly to the radial-axial plane. In that case the spring can be supported at the receiving seat and at the adjusting element.

In particular, with the above-described wedge-shaped arrangement of two rails, the radial-axial plane can be the angle bisector of the wedge angle. For that purpose, the adjusting element, with respect to a longitudinal sectional plane having the displacement direction and the adjustment direction, can have a profile in the form of an arrow which is halved in the adjustment direction, with or without a stepped arrow tip.

Also, advantageously in regard to fitment, the adjusting element can be arranged guided in the receiving seat with an adjustment travel which is limited by way of an abutment.

The ease of movement of the linear guide can be adjusted by way of the wedge angle, the force applied to the adjusting element and/or the choice of the material pairing of slider/rail and rails/guide surfaces respectively. In order for example to provide a readily moveable linear guide the wedge angle can be substantially larger than the wedge angle with which a self-locking action occurs as a consequence of increased frictional forces upon displacement. If, as for example in the case of automatic drinks machines or frequently in the case of measuring tables, sluggishness of movement is wanted, then the size of the wedge angle can be close to that of the self-locking wedge angle. Similarly, the materials of the rails can be so selected that they minimise frictional forces which occur in the sliding movement for ease of movement or increase such forces for sluggishness of movement. Finally, the force acting on the adjusting element also influences the frictional force between the slide surfaces.

The slider and therewith also the rail can each have two slide surface pairs, wherein one of the slide surface pairs of the slider has the slide surface associated with the adjusting element. In particular because of the wedge-shaped arrangement of the slide surfaces it is possible in particular to set without a problem sluggishness of movement of the slider, insofar as the slider is moved with the displacement of the adjusting element with play reduction with its other slide surfaces against the guide surfaces of the rail, in particular being pressed thereagainst.

In force-mechanical terms the two slide surface pairs can be arranged in mirror-image symmetry relative to each other with respect to a plane of mirror symmetry perpendicularly to the adjustment direction.

It is also possible for both slide surface pairs of the slider to have a respective slide surface with associated adjusting element.

From tribological points of view it is advantageous if the slider and the at least one adjusting element are made from a plastic, preferably a tribological special plastic, which cooperates lubricant-free with the rail. For mechanical reasons the rail can be made from metal, in particular aluminium. The slider and the adjusting element are preferably made from the same tribopolymer, in particular using an injection molding process.

If in an embodiment of the linear guide there is only one adjusting element then advantageously from the force-mechanical point of view that adjusting element can be arranged centrally on the slider with respect to the displacement direction.

If for example there are two adjusting elements then advantageously from the force-mechanical point of view they can be respectively arranged with respect to the displacement direction in an axial end region of the slider. To avoid a tilting moment the slide surfaces of the two adjusting elements can be arranged in the same slide surface of the slider.

The adjusting element can be of a plate-shaped configuration of small width. The adjusting element can be longer in the adjustment direction than in the displacement direction. The ratio of the length of the adjusting element in the adjustment direction with respect to its width in the displacement direction can thus be >1 to even substantially greater than 1. The width of the adjusting element can be for example smaller than/equal to 50% or smaller than/equal to 30%, preferably smaller than/equal to 10% of the length of the slider in the displacement direction. The small width of the adjusting element has the advantage that the associated receiving seat only has to be of a narrow configuration corresponding to the slider and thus the strength of the slider is reduced correspondingly slightly and thus to an insubstantial extent. Moreover, as a consequence of the small width, the contact surfaces between the adjusting element and the receiving seat and thus the frictional forces occurring upon play reduction are correspondingly slight so that the force required for play reduction and thus structurally the spring for generating that force can be correspondingly small. That permits fine adjustment of the play reduction effect. That in turn has the advantage that the required structural length of the spring and the adjusting element in the adjustment direction can be kept small. That in turn requires a correspondingly reduced slider width in the adjustment direction. In that way the self-adjusting play reduction of the invention and thus the linear guide can be substantially miniaturised in comparison with the state of the art.

BRIEF DESCRIPTION OF THE DRAWINGS

Further details and advantages of the invention will be apparent hereinafter, without limitation on the scope of protection, from the description of a preferred embodiment, with reference to the accompanying drawings in which:

FIG. 1 shows a view of a configuration of a linear guide with rail and slider linearly guided therein;

FIG. 2 shows an end view of the linear guide of FIG. 1;

FIG. 2a shows an enlarged view of the portion B in FIG. 2;

FIG. 3 shows a sectional view of the linear guide along section line c-c in FIG. 1;

FIG. 3a shows an enlarged view of the portion C in FIG. 2;

FIG. 4 shows a view from below of the slider of FIG. 1;

FIG. 5 shows a perspective view from below of the slider of FIG. 4; and

FIGS. 6a and 6b each show an exploded perspective view of the slider of FIG. 4.

DETAILED DESCRIPTION

FIGS. 1 to 3 each show a preferred embodiment of a linear guide 1 having a rail 2, a slider 3 guided in the rail 2 and a self-adjusting play reducing means 4 of the linear guide 1 with an adjusting element 41. FIGS. 4 to 6 show various views of the slider 3 with the play reducing means 4.

Here the rail 2 has four guide surfaces 21 at which the slider 3 is slidingly displaceably mounted and guided in the displacement direction v with here correspondingly four slide surfaces 31. As can be seen in particular from FIG. 4 the adjusting element 41 has a further slide surface 42 forming a portion a of the slide surface 31 at the right in FIG. 4. In this embodiment of the slider 1 all guide surfaces 21 and slide surfaces 31, 42 are in the form of prismatic surfaces extending in the displacement direction v. The guide surfaces 21 and slide surfaces 31, 42 are so matched to each other that, in the installed position of the slider 3 with adjusting element 41 and rail 2, the mutually associated guide surfaces 21 and slide surfaces 31, 42 extend parallel to each other. The linear guide 1 is thus in the form of a prism guide.

The adjusting element 41 is arranged displaceably in a receiving seat 32 provided on the slider 3 (FIG. 3a) for play reduction in the adjustment direction e perpendicularly to the displacement direction v. The adjusting element 41 is integrated in the slider 3.

As can be seen in particular from FIGS. 2a and 3a, for play reduction in a working position, that is to say in the installation position of the slider 3 on the rail 2, the adjusting element 41 projects at its end in the adjustment direction e with its slide surface 42 beyond the outside contour of the slider 3, only by a small amount b, in order to bear in surface contact, with its further slide surface 42, against the guide surface 21 opposite thereto of the rail 2. That projecting relationship is also to be observed in regard to the further slide surface 42 of the adjusting element 41, beyond the slide surface 31 of the slider 3, that is associated with the adjusting element. That amount b can be equal to or approximately equal to that of the play reduction or can be set equal thereto. The invention however is not limited to the amount b shown in FIGS. 2a and 3a and under some circumstances can differ considerably therefrom.

The adjusting element 41 is acted upon radially outwardly with a force in the adjustment direction e with respect to its longitudinal axis 1, the force pressing the adjusting element 41 over an adjustment travel w shown in FIG. 3a against the associated guide surface 21 of the rail 2, and possibly slides against same. In that way it is possible to achieve practically play-free mounting of the slider 3 in the rail 2. As a result of the sliding movement of the slide surfaces 21, 31, 42 against each other, adjustment of the play occurs steplessly.

As can be seen in particular from FIGS. 3 and 3a the adjusting element 41 has a spring receiving seat 43 with a spring 45 which here is in the form of a coil spring and which is guided in a sleeve 44 to prevent buckling thereof, the spring 45 projecting at both ends out of the sleeve. The spring 45 is arranged in a biased condition in the spring receiving seat 43. It is supported at the drive side against the slider 3 and at the driven side against the adjusting element 41, whereby the adjusting element 41 is urged towards the guide surface 21, associated therewith, of the rail 2. Because of the changes which are slight in themselves in the spring travel in the self-adjusting spring reduction situation in operation of the linear guide the spring force can be assumed to be constant. To avoid creep phenomena which change the spring force as in the case of plastics the spring is made here from steel.

In contrast the other components of the slider 3 and the adjusting element 41 are preferably made from a tribologically optimised plastic which cooperates lubricant-free with the rail 2. The rail 2 can be made from metal, in particular aluminium, preferably anodised aluminium, for example in the form of an extruded profile. That allows inter alia low-wear metal-plastic sliding friction.

The rail 2 and the slider 3 each have two slide surface pairs 5, wherein the two slide surface pairs 5 of the rail 2 respectively have two guide surfaces 21 and the two slide surface pairs 5 of the slider 3 each have two slide surfaces 31 (FIG. 2). The guide surfaces 21 and slide surfaces 31 of each of the slide surface pairs 5 are arranged to converge in a wedge configuration with a wedge angle β perpendicularly and radially outwardly with respect to the displacement direction v. To prevent self-locking the wedge angle β is greater than the wedge angle at which a self-locking action occurs. Because the guide surfaces 21 and slide surfaces 31 are arranged in a wedge-like configuration the illustrated embodiment is suitable for adjusting a given degree of sluggishness of movement.

The two slide surface pairs 5 of the rail 2 and the two slide surface pairs 5 of the slider 3 are respectively arranged in mirror-image symmetrical relationship with each other perpendicularly to the adjustment direction e in each case with respect to a central mirror-image symmetry plane S (see FIG. 2). Thus, the inside contour of the rail 2 for receiving the slider 3 and the outside contour of the slider 3 for engagement into the inside contour of the rail 2 converge wedge-shaped in the adjustment direction whereby the slider 3 is arranged mounted non-rotatably in the rail 2 relative to the displacement direction v.

As provided in the embodiment of the linear guide 1 shown in the Figures here two adjusting elements 41 are provided only at one of the slide surfaces 31, which however is sufficient to adjust the play between the other guide surfaces 21 and slide surfaces 31. Initially only the play relative to one guide surface 21 of the rail 2 is adjusted or reduced by the adjusting element 41. Under the effect of the spring force that reduction in play is further implemented by displacement of the slider 3 in the inside contour of the rail 2 towards the other guide surfaces 21 of the rail 2. In that case the wedge-shaped arrangement of the surfaces 21, 31 promotes a substantial reduction in play as far as producing sluggishness of movement as the slider 3 is wedged in the rail 2 by virtue of the associated surfaces 21, 31, 42 sliding against each other. Moreover, the two adjusting elements 41 are mounted in sliding displaceable relationship at their ends in a respective receiving seat 32 spaced from each other in the longitudinal direction 1.

The receiving seat 32 for the adjusting element 41 has a side surface 33 which is disposed in a radial-axial plane which is at the same time the angle bisector for the wedge angle β, wherein the adjusting element 41 is guided against the side surface 33 in slidingly displaceable relationship in the adjustment direction e, that is to say, precisely perpendicularly to the displacement direction v.

As can be seen from FIGS. 3 and 3a the adjustment travel w of the adjusting element 41 in the receiving seat 32 is limited by abutments 46. For that purpose, the adjusting element 41 bears at the bottom against the receiving seat 32 in opposite relationship to the adjustment direction e. For limiting the adjustment travel w in the adjustment direction e, the adjusting element 41 and the receiving seat 32 each have a set-back portion 47 as an abutment 46, at which they are guided relative to each other.

The adjusting element 41 is substantially plate-shaped and narrow. Its extent in the displacement direction v is substantially less than its extent in the adjustment direction e. Thus, with a given width of the slider 3, the side surface of the adjusting element, in which it bears slidingly displaceably against the side surface 45 of the receiving seat, is relatively small. Thus, in regard to geometry, the frictional forces upon displacement of the adjusting element 41 in the rail 2 are low so that the spring force of the spring 45, with a simplification in structure and mounting, also only has to be correspondingly low. That therefore permits finer adjustment of the play.

As shown in FIGS. 1 and 2 respectively the rail 2 and the slider 3 each have two usual openings 6 for example for fixing the rail 2 to a base or for fixing a structure to the slider 3.

Further advantages of the invention that are worth mentioning are:
lubricant-free running (without lubricating agent);
stepless smooth sliding of the slider;
good hold for the slider (positional stability);
constant displacement forces;
quiet and rattle-free movement; and
compact structure.

The linear guide 1 according to the invention is thus suitable for many purposes, in particular for furniture construction, the production of head supports and backrests and armrests for example in the motor vehicle sector, height adjustment in kitchen equipment or the mechanics of 3D printers.

LIST OF REFERENCES 1 linear guide
2 rail
21 guide surface
3 slider
31 slide surface
32 receiving seat
33 side surface
4 play reduction
41 adjusting element
42 further slide surface
43 spring receiving seat
44 sleeve
45 spring
46 abutment travel
47 set-back portion
5 slide surface pair
6 opening
β wedge angle
b amount
e adjustment direction
l longitudinal direction
v displacement direction
w adjustment travel
S plane of mirror-image symmetry

What is claimed is:
1. A linear guide comprising:
a slider having at least one slide surface, the slider comprising a slider body having a slider body surface configured to provide a slider body surface portion of the slide surface, and at least a first adjusting element having a first adjusting element surface configured to provide a first adjusting element surface portion of the slide surface,
a rail having at least one guide surface,
wherein the slider is slidingly displaceable in a displacement direction relative to the rail, with the slide surface of the slider slideable on the guide surface of the rail, wherein the slider body comprises a receiving seat, and the first adjusting element is mounted in the receiving seat of the slider body such that the first adjusting element is slidingly displaceable in an adjustment direction relative to the slider body, wherein the adjustment direction is perpendicular to the displacement direction, and wherein the first adjusting element provides self-adjusting play reduction between the slider and the rail with the first adjusting element surface of the first adjusting element being displaceable to project beyond the slider body surface of the slider body in the adjustment direction.

2. The linear guide according to claim 1, wherein for the play reduction, the first adjusting element is acted upon in the adjustment direction with a constant or almost constant force.

3. The linear guide according to claim 1, wherein for the play reduction, the first adjusting element is acted upon in the adjustment direction by a spring force.

4. The linear guide according to claim 1, wherein, when the first adjusting element surface of the first adjusting element is displaced to project beyond the slider body surface of the slider body in the adjustment direction, the first adjusting element surface projects at least or precisely by an amount of the play reduction.

5. The linear guide according to claim 1, wherein the first adjusting element is linearly displaceable.

6. The linear guide according to claim 1, wherein the guide surface of the rail and the slide surface of the slider are planar surfaces.

7. The linear guide according to claim 1, wherein the at least one slide surface of the slider comprises a slide surface pair having two slide surfaces, of which one slide surface of the slide surface pair comprises the slider body surface and the first adjusting element surface, and wherein the two slide surfaces of the slide surface pair are each part of a wedge-shape which converges outwardly with respect to the adjustment direction, and forms a wedge angle perpendicular to the displacement direction.

8. The linear guide according to claim 7, wherein the receiving seat has a side surface disposed in a plane that extends parallel with respect to the displacement direction and the adjustment direction for slidingly displaceable contact of the first adjusting element with the slider body, wherein the plane is an angle bisector of the wedge angle.

9. The linear guide according to according to claim 8, wherein the first adjusting element is arranged guided with a limited adjustment travel in the receiving seat, wherein the adjustment travel is limited by at least one abutment.

10. The linear guide according to claim 7, wherein the wedge angle is larger than a self-locking wedge angle, at which a self-locking action occurs as a consequence of increased frictional forces upon displacement of the slider.

11. The linear guide according to claim 1, wherein the at least one slide surface of the slider comprises two slide surface pairs, wherein one slide surface of one slide surface pair of the slide surface pairs comprises the slider body surface and the first adjusting element surface, and wherein the two slide surface pairs are arranged on opposite sides of the slider.

12. The linear guide according to claim 1, wherein the slider body and the at least one adjusting element are made from plastic and wherein the rail is made from metal.

13. The linear guide according to claim 1, further comprising at least a second adjusting element, and the second adjusting element having a second adjusting element surface configured to provide a second adjusting element surface portion of the slide surface and wherein the slider body surface, the first adjusting element surface and the second adjusting element surface are all slideable on the guide surface of the guide rail.

14. A slider configured for a linear guide having a rail having at least one guide surface, comprising:

the slider having at least one slide surface, the slider comprising a slider body having a slider body surface configured to provide a slider body surface portion of the slide surface, and at least a first adjusting element having a first adjusting element surface configured to provide a first adjusting element surface portion of the slide surface, the slider configured to be slidingly displaceable in a displacement direction relative to the rail, with the slide surface of the slider configured to slide on the guide surface of the rail, wherein the slider body comprises a receiving seat, and the first adjusting element is mounted in the receiving seat of the slider body such that the first adjusting element is slidingly displaceable in an adjustment direction relative to the slider body, wherein the adjustment direction is perpendicular to the displacement direction, and wherein the first adjusting element is configured to provide self-adjusting play reduction between the slider and the rail with the first adjusting element surface of the first adjusting element being displaceable to project beyond the slider body surface of the slider body in the adjustment direction.

15. The slider according to claim 14, wherein for the play reduction, the first adjusting element is acted upon in the adjustment direction with a constant or almost constant force.

16. The slider according to claim 14, wherein for the play reduction, the first adjusting element is acted upon in the adjustment direction by a spring force.

17. The slider according to claim 14, wherein, when the first adjusting element surface of the first adjusting element is displaced to project beyond the slider body surface of the slider body in the adjustment direction, the first adjusting element surface projects at least or precisely by an amount of the play reduction.

18. The slider according to claim 14, wherein the first adjusting element is linearly displaceable.

19. The slider according to claim 14, wherein the slide surface of the slider is a planar surface.

20. The slider according to claim 14, wherein the at least one slide surface of the slider comprises a slide surface pair having two slide surfaces, of which one slide surface of the slide surface pair comprises the slider body surface and the first adjusting element surface, and wherein the two slide surfaces of the slide surface pair are each part of a wedge-shape which converges outwardly with respect to the adjustment direction, and forms a wedge angle perpendicular to the displacement direction.

21. The slider according to claim 20, wherein the receiving seat has a side surface disposed in a plane that extends parallel with respect to the displacement direction and the adjustment direction for slidingly displaceable contact of the first adjusting element with the slider body, wherein the plane is an angle bisector of the wedge angle.

22. The slider according to according to claim 21, wherein the first adjusting element is arranged guided with a limited adjustment travel in the receiving seat, wherein the adjustment travel is limited by at least one abutment.

23. The slider according to claim 20, wherein the wedge angle is larger than a self-locking wedge angle, at which a self-locking action occurs as a consequence of increased frictional forces upon displacement of the slider.

24. The slider according to claim 14, wherein the at least one slide surface of the slider comprises two slide surface pairs, wherein one slide surface of one slide surface pair of the slide surface pairs comprises the slider body surface and the first adjusting element surface, and wherein the two slide surface pairs are arranged on opposite sides of the slider.

25. The slider according to claim 14, wherein the slider body and the at least one adjusting element are made from plastic.

26. The slider according to claim 14, further comprising at least a second adjusting element, and the second adjusting element having a second adjusting element surface configured to provide a second adjusting element surface portion of the slide surface and wherein the slider body surface, the first adjusting element surface and the second adjusting element surface are all arranged to be slideable on the guide surface of the guide rail.

\* \* \* \* \*